US009715312B2

(12) United States Patent
Khazeni et al.

(10) Patent No.: US 9,715,312 B2
(45) Date of Patent: Jul. 25, 2017

(54) INPUT DEVICE HAVING ANTI-STATIC LAYER BYPASS

(71) Applicant: SYNAPTICS INCORPORATED, San Jose, CA (US)

(72) Inventors: Kasra Khazeni, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 50 days.

(21) Appl. No.: 14/859,771

(22) Filed: Sep. 21, 2015

(65) Prior Publication Data

US 2017/0083151 A1    Mar. 23, 2017

(51) Int. Cl.
*G06F 3/041*  (2006.01)
*G06F 3/044*  (2006.01)
*H05F 3/02*  (2006.01)

(52) U.S. Cl.
CPC ............ *G06F 3/0418* (2013.01); *G06F 3/044* (2013.01); *H05F 3/02* (2013.01); *G06F 2203/04107* (2013.01)

(58) Field of Classification Search
CPC ................... G06F 3/0418; G06F 3/044; G06F 2203/04107; H05F 3/02
See application file for complete search history.

(56) References Cited

U.S. PATENT DOCUMENTS

| 8,591,279 B1 | 11/2013 | Cok et al. |
| 2011/0285640 A1 | 11/2011 | Park et al. |
| 2012/0044176 A1 | 2/2012 | Nakamura et al. |
| 2013/0044074 A1 | 2/2013 | Park et al. |
| 2013/0257773 A1 | 10/2013 | Shih et al. |
| 2015/0090573 A1* | 4/2015 | Mansky ............ H03K 17/9618 200/5 R |

\* cited by examiner

*Primary Examiner* — Charles Hicks
(74) *Attorney, Agent, or Firm* — Patterson + Sheridan, LLP

(57) ABSTRACT

An input device having an anti-static layer coupled to a grounding element such as a cellphone bottom chassis via a current hindering circuit having a resistive circuit element. Without the current hindering circuit having a resistive circuit element, a large amount of the current from an input object would flow through the connection to the grounding element and would not flow to a receiver channel for processing. This decreases the signal strength within the receiver channel, making sensing more difficult to perform. However, with the current hindering circuit having a resistive circuit element, current is hindered from flowing to ground and thus flows to the receiver channel, thereby increasing the signal strength. The current hindering circuit having a resistive circuit element may be a resistor or a Zener diode that is directed to prevent current flow from the anti-static layer to the grounding element until a significant voltage has built up across the Zener diode.

20 Claims, 6 Drawing Sheets

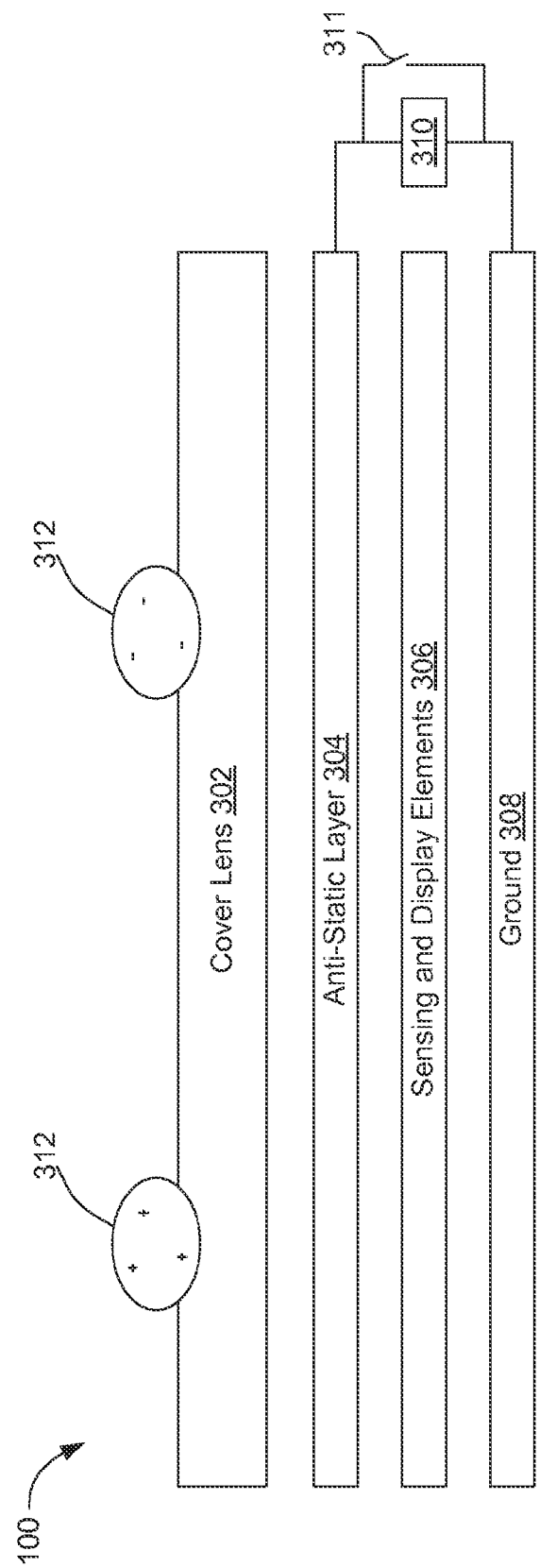

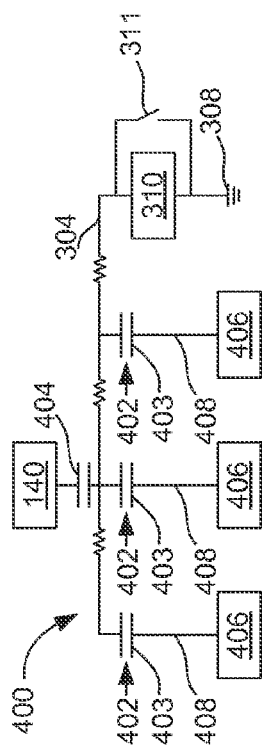
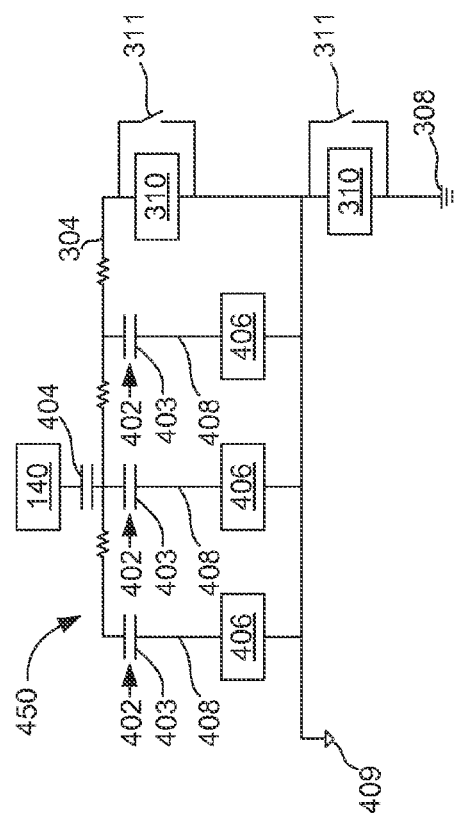

INPUT DEVICE HAVING ANTI-STATIC LAYER BYPASS

BACKGROUND

Field of the Disclosure

Embodiments generally relate to input sensing and, in particular, to an anti-static layer bypass for an input sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Input devices typically include a transparent cover lens whose purpose is to provide physical protection to the rest of the device. Display elements within an input device may be affected by static charge that builds up on the cover lens. An anti-static layer is typically disposed between the cover lens and display elements in order to shield the display elements from effects related to the static charges. Some input devices include sensing elements (e.g., touch sensing or proximity sensing elements) that are integrated with the display elements. While an anti-static layer may improve functioning of display elements, such a layer may hinder the functioning of sensing elements.

SUMMARY

An input device is provided. The input device includes a plurality of display elements, a plurality of sensor electrodes, and a cover lens disposed over the plurality of display elements and the plurality of sensor electrodes. The input device also includes an anti-static layer disposed between the cover lens and at least a portion of the plurality of display elements and the plurality of sensor electrodes, as well as a grounding conductor electrically coupled to the anti-static layer via a current hindering circuit having a resistive circuit element.

An electronic device is also provided. The electronic device includes an enclosure, a plurality of display elements within the enclosure, and a plurality of sensor electrodes within the enclosure. The electronic device also includes a cover lens disposed over the plurality of display elements and the plurality of sensor electrodes and presenting a surface for touch object interface to the sensor electrodes, an anti-static layer disposed between the cover lens and at least a portion of the plurality of display elements and the plurality of sensor electrodes, and a grounding conductor electrically coupled to the anti-static layer via a current hindering circuit having a resistive circuit element.

A method is also provided. The method includes updating a display element of a plurality of display elements. The method also includes driving a sensor electrode for sensing, the sensor electrode being part of a plurality of sensor electrodes. The method further includes receiving a signal with the sensor electrode, the signal received through a capacitive coupling between the sensor electrode and an anti-static layer disposed between a cover lens and at least a portion of the plurality of display elements, the anti-static layer being electrically coupled to a grounding conductor via a current hindering circuit having a resistive circuit element.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

FIG. 3 is an exploded view of an input device illustrating a mechanism for improving touch signal while using an anti-static layer, according to an example.

FIGS. 4A and 4B show circuit diagrams illustrating sensing elements of sensing and display elements of FIG. 3, according to an example.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide an input device having an anti-static layer coupled to a grounding element such as a cellphone bottom chassis via a current hindering circuit having a resistive circuit element. Without the current hindering circuit having a resistive circuit element, a large amount of the current from an input object would flow through the connection to the grounding element and would not flow to a receiver channel for processing. This decreases the signal strength within the receiver channel, making sensing more difficult to perform. However, with the current hindering circuit having a resistive circuit element, current is hindered from flowing to ground and thus flows to the receiver channel, thereby increasing the signal strength. The current hindering circuit having a resistive circuit element may be a resistor or a Zener diode that is configured to prevent current flow from the anti-static layer to the grounding element until a significant voltage has built up across the Zener diode.

Figure 1:
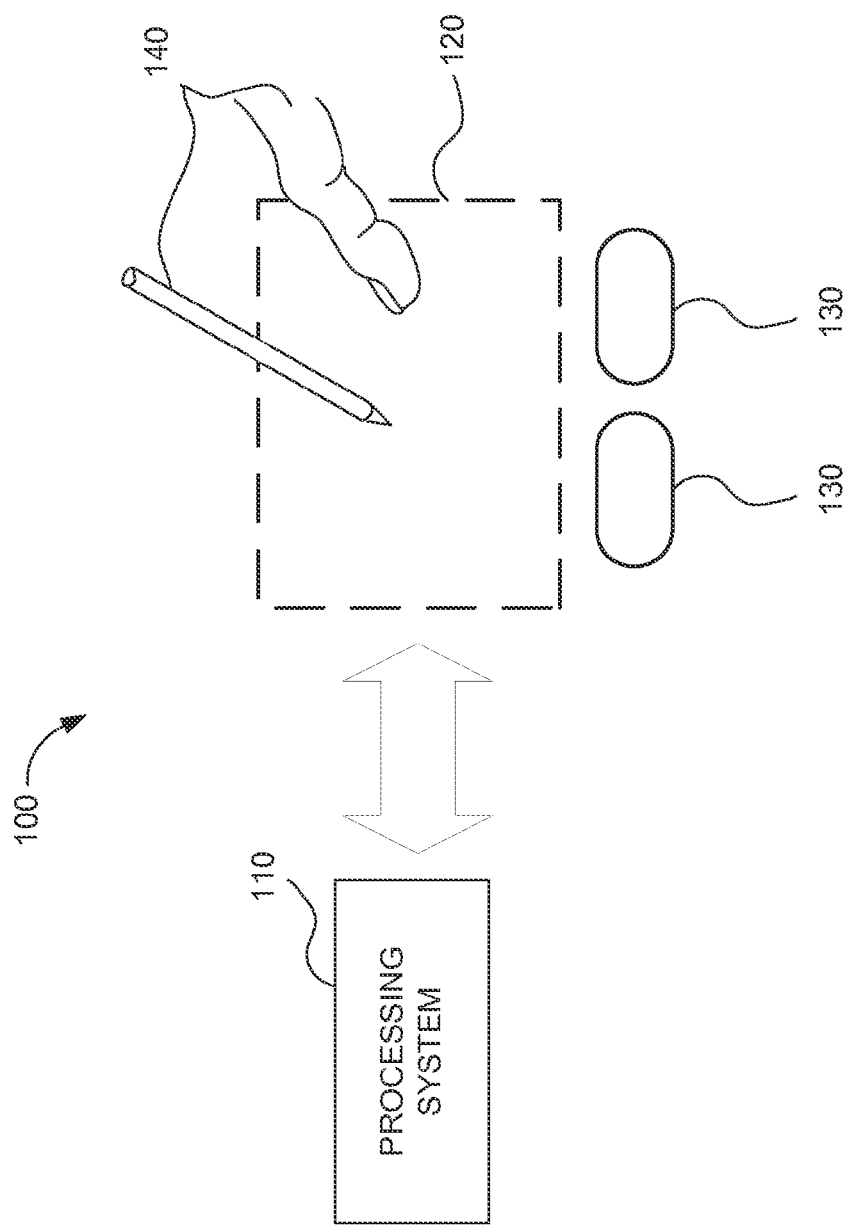
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
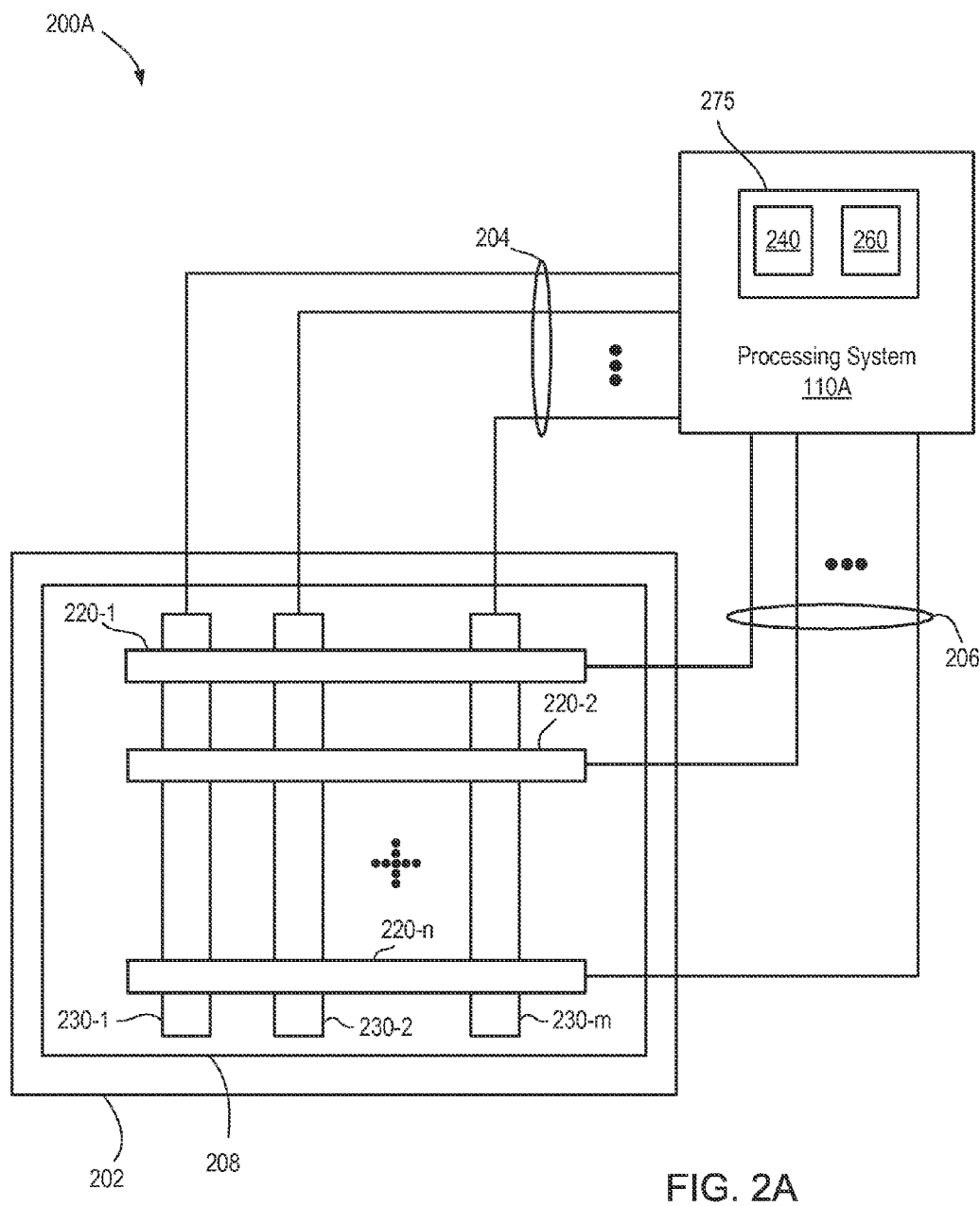
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be transmitter electrodes and sensor electrodes 230 may be receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
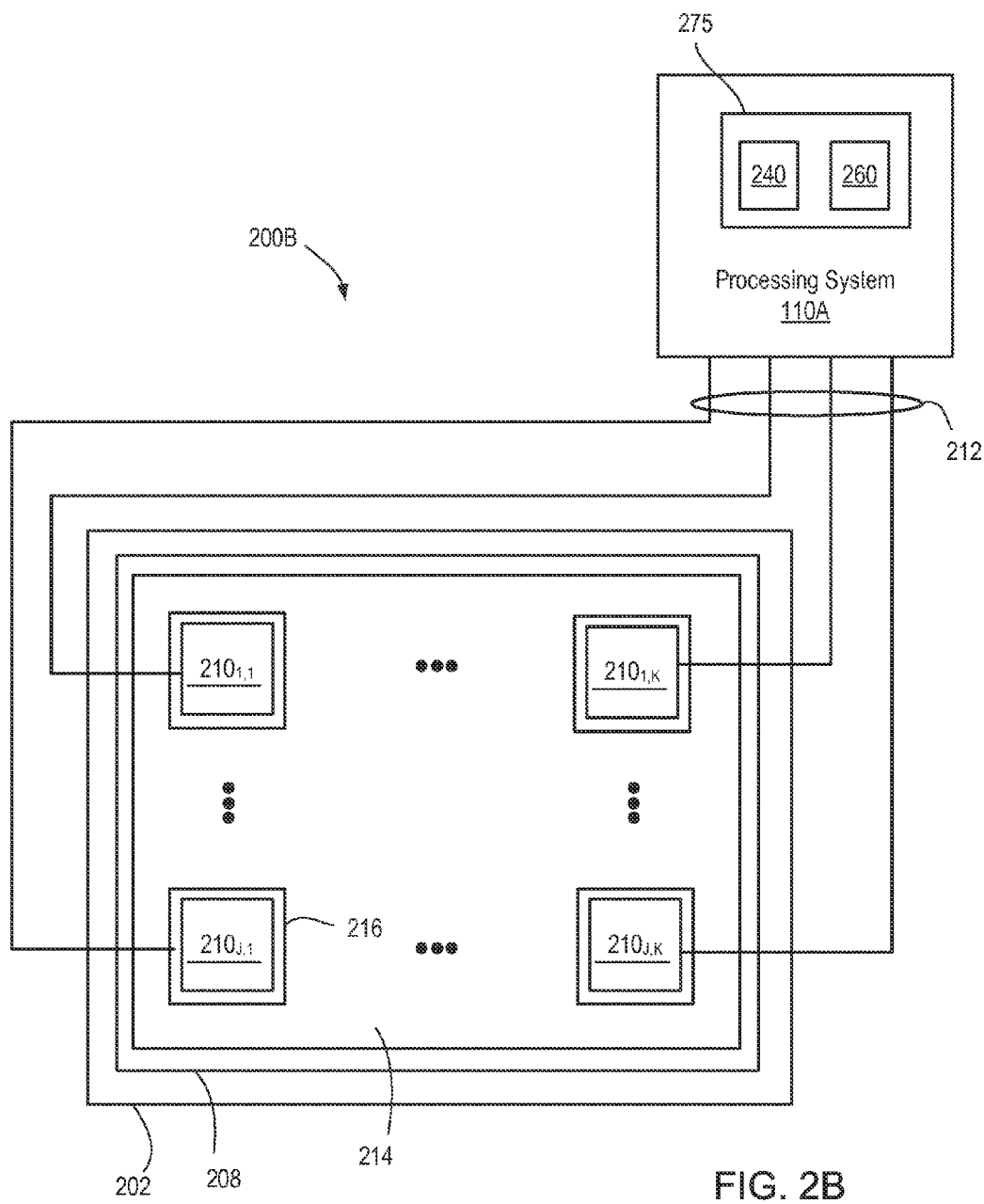
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110A excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). In another example, the system ground may be the common voltage of the display electrodes (i.e., "VCOM"). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

FIG. 3 is an exploded view of an input device 100 illustrating a technique for improving touch signal while using an anti-static layer, according to an example. As shown, input device 100 includes a cover lens 302, anti-static layer 304, touch and display elements 306, ground 308, and current hindering circuit having a resistive circuit element 310, as well as switching element 311. Note that various elements of input device 100 are not shown in FIG. 3 for clarity. For example, input device 100 may include the processing system 110 of FIG. 1, as well as other elements appropriate for operation.

Sensing and display elements 306 include sensing elements described above and with respect to FIGS. 1 and 2A-2B, including sensor electrodes 220 and the like, as well as display elements such as pixel transistors, pixel electrodes, liquid crystal material (or other variable characteristic light-transmissive material), conductors for transmitting signals (such as traces providing signals to the various elements), and other elements. These sensing and display elements 306 provide sensing functionality, such as sensing presence of an input object 140 (FIG. 1) in a sensing region, as well as displaying pixels.

Cover lens 302 is generally a glass or plastic layer placed over sensing and display elements 306 in order to physically protect those elements. In some embodiments, the cover lens 302 is a hardened polarizer, for example, a hardened layer (e.g., urethane, acrylic, etc). Cover lens 302 is made from a material that is a very poor conductor of electricity. Because an input object 140 such as a human finger may frequently come into contact with and move around on cover lens 302, static charge (such as charges 312 illustrated in FIG. 3) may build up at various disparate locations on cover lens 302. Such static charges may undesirably alter what is displayed by display elements because static charge affects electric field within electric field-dependent portions of display elements of sensing and display elements 306. For example, for liquid crystal type display elements, a pixel capacitor sets a voltage through liquid crystal material to control light transmissivity for individual sub-pixels by adjusting the direction of polarization of light through liquid crystal material. Total amount of light transmitted is based on the direction of polarization of light in comparison with the direction of polarization of a polarizing filter placed above the sub-pixels. Stray static charge on cover lens 302 may affect the electric field for that liquid crystal material, changing the direction of polarization of light to one other than what is specified, thus affecting the brightness of the sub-pixel and the resulting color.

An anti-static layer 304 ("ASL") is provided to shield display elements of sensing and display elements 306 from static charges that build up on cover lens 302. The anti-static layer 304 is a conductive layer disposed between cover lens 302 and sensing and display elements 306 that shields the display elements from changes in electric field caused by static charge build up. The ASL 304 is coupled to a grounding element such as chassis ground 308 and/or self-guarding display ground 409 (FIG. 4B). In some embodiments, a bottom chassis may be (or may be part of) a conductive enclosure surrounding elements of input device 100 that provides a "ground" reference voltage for elements of the input device 100. In some embodiments, this bottom chassis may be the ground 308. In other embodiments, the system ground may be the ground 308. In some embodiments, ground 308 may comprise a second ASL layer. In another embodiment, a second ASL layer is disposed as part of the polarizer contained within the sensing and display elements 306.

With ASL 304 coupled directly to ground 308 (e.g., a chassis ground) by a conductive element having no resistance, sensing performance may be hindered. Specifically, current that "should" flow from a sensor electrode to an appropriate circuit element for processing sensing signals from that sensor electrode would instead flow to the ground 308. Therefore, a current hindering circuit having a resistive circuit element 310 is added between ASL 304 and ground 308, to improve sensing performance.

Referring to FIG. 4A, a circuit diagram 400 illustrating sensing elements of sensing and display elements 306 is shown, according to an example. Multiple sensor electrodes 403, each coupled to processing circuitry 406, are shown. The processing circuitry 406 may be a portion of processing system 110 of FIG. 1.

Circuit diagram 400 shows an anti-static layer capacitive coupling 404 ("ASL capacitive coupling"), which comprises the capacitive coupling between the ASL 304 and input object 140. Anti-static layer 304 is also capacitively coupled to sensor electrodes 403 (which may be sensor electrodes 220) to form receiver couplings 402. Sensor electrodes 403 are coupled to receiver channels 408, which lead to processing circuitry 406 of the processing system 110. Current may thus flow from input object 140, through ASL capacitive coupling 404 to ASL 304, then through receiver couplings 402 to sensor electrodes 403. Resistor symbols are shown on ASL 304 and represent the sheet resistance of ASL 304.

Current received at processing circuitry 406 closest to input object 140 (i.e., coupled to the sensor electrode that is physically closest to the input object 140) is generally interpreted as a signal associated with the input object 140. In other words, in general, one of the receiver channels 408—the one that is coupled to the sensor electrode closest to the input object 140 and thus receives the strongest signal—is the receiver channel 408 deemed to hold the most information about the input object 140 and is thus deemed to be a "primary" receiver channel herein. Of course, multiple neighboring receiver channels 408 may include information indicative of a particular input object 140.

Presence of the anti-static layer 304 provides a conductive path by which signal strength for the "primary" receiver channel 408 may be weakened. More specifically, with a simple conductive connection between anti-static layer 304 and chassis ground 308 (e.g., without current hindering circuit having a resistive circuit element 310), signal strength for the primary receiver channel 408 is weakened due to a relatively large amount of current flow between sensor capacitor 404 and chassis ground 308, for which resistance is very low compared to resistance of receiver couplings 402. In other words, a large amount of current flows from ASL 304 to chassis ground 308 instead of flowing to processing circuitry 406 through receiver couplings 402. In the embodiment of FIG. 4A, chassis ground 308 may also be a display ground.

FIG. 4B is a circuit diagram 450 illustrating sensing elements of sensing and display elements 306, according to another example. The circuit diagram 450 is similar to the circuit diagram 400 of FIG. 4A, except that a self-guarding display ground 409 is shown. Ground 308 may be a bottom chassis as described above with respect to FIG. 4A. Self-guarding display ground 409 may exist in active matrix embodiments where the power supply (including self-guarding display ground 409) is modulated with respect to a separate grounded element such as a conductive back plate of the input device 100. Because of this modulation, display ground 409 is modulated with respect to chassis ground 308. Thus, self-guarding display ground 409 is coupled through the first resistive circuit element 310 to the ASL 304. Self-guarding display ground 409 is also coupled to a second current hindering circuit having a resistive circuit element 310 that is coupled to chassis ground 308 with a switch 311 connected in parallel as shown. Charge is flowed from self-guarding display ground 409 to display ground 308 via the second current hindering circuit having a resistive circuit element 310. In some embodiments, both current hindering circuits having resistive circuit elements 310 are Zener diodes. In some embodiments, the Zener diode between the ASL 304 and display ground 409 is directed to prevent current flow from the display ground 409 to the ASL 304 until a threshold voltage is met and the Zener diode between the display ground 409 and the ground 308 is directed to prevent current flow from the display ground to ground 308 until a threshold voltage is met.

Referring to FIGS. 3 and 4A-4B, the current hindering circuit having a resistive circuit element 310 provided between anti-static layer 304 and ground 308 reduces current flow from the anti-static layer 304 to ground 308. By increasing resistance between anti-static layer 304 and ground 308, more current flows through receiver couplings 402, which improves signal strength at the receiver channel 408 coupled to the sensor electrode 403 closest to the input object 140 (as well as at neighboring receiver channels 408).

Current hindering circuit having a resistive circuit element 310 may be a Zener diode, which is a diode that acts as a regular diode (i.e., allows current to flow in only one direction) but allows current to flow in the reverse biased direction if reverse-biased with voltage above a threshold. The Zener diode would have a direction against current flow from the anti-static layer 304 to ground 308 so that current does not pass from the anti-static layer 304 to ground unless the Zener diode is reverse biased above the threshold voltage of the Zener diode. In some embodiments, the threshold voltage for the Zener diode is 5-10 Volts. Current hindering circuit having a resistive circuit element 310 may alternatively be a resistor. In some embodiments, the resistor has a resistance that is larger than the sheet resistance of the anti-static layer. In some embodiments, the resistance of the resistor is in the range of between 50 ohms and 100 ohms. In some embodiments, the resistance of the resistor is greater than 100 ohms. In some embodiments, the current hindering circuit having a resistive circuit element 310 is a transient voltage suppressor, or a switch.

A switching element 311 is optionally provided in parallel with current hindering circuit having a resistive circuit element 310. The switching element is used to ground 308 the anti-static layer 304 periodically. The switching element 311 may comprise a transistor, for example. Processing system 110 may close switching element 311 in a period in which sensing does not occur and may open switching element 311 in a period in which sensing does occur. Closing the switching element 311 provides a path through which charge on ASL 304 can be dissipated to ground when not performing sensing.

Sensing and display updating may be performed "simultaneously." The term "simultaneously" means that touch sensing for one or more sensor electrodes of the input device 100 is performed at the same time as display updates with one or more of the display elements of the input device 100. Simultaneous display update and sensing may mean that display updating and sensing is done in a single, common period. Switching element 311 may be closed in time periods between such common periods—periods in which sensing does not occur. Switching element 311 may be opened in other time periods—i.e., in periods in which sensing does occur.

Sensing electrodes may be integrated with display elements. For example, display elements may include two electrodes that form a capacitor with a material between the two electrodes that varies characteristics related to light transmitted through that material based on a voltage across that material. One of those electrodes provides a reference voltage against which the other electrode may apply a voltage to set the variable characteristic of the transmissive material. Setting the variable characteristic of the transmissive material may be referred to herein as "updating the display element."

Simultaneous sensing and display updating may involve updating display elements while also sensing with sensing elements integrated with those display elements. Alternatively or additionally, simultaneous sensing may involve updating display elements while sensing with sensing elements other than those that are integrated with the display elements, as well as sensing with sensing elements while updating display elements other than those that are integrated with the sensing elements.

Figure 5:
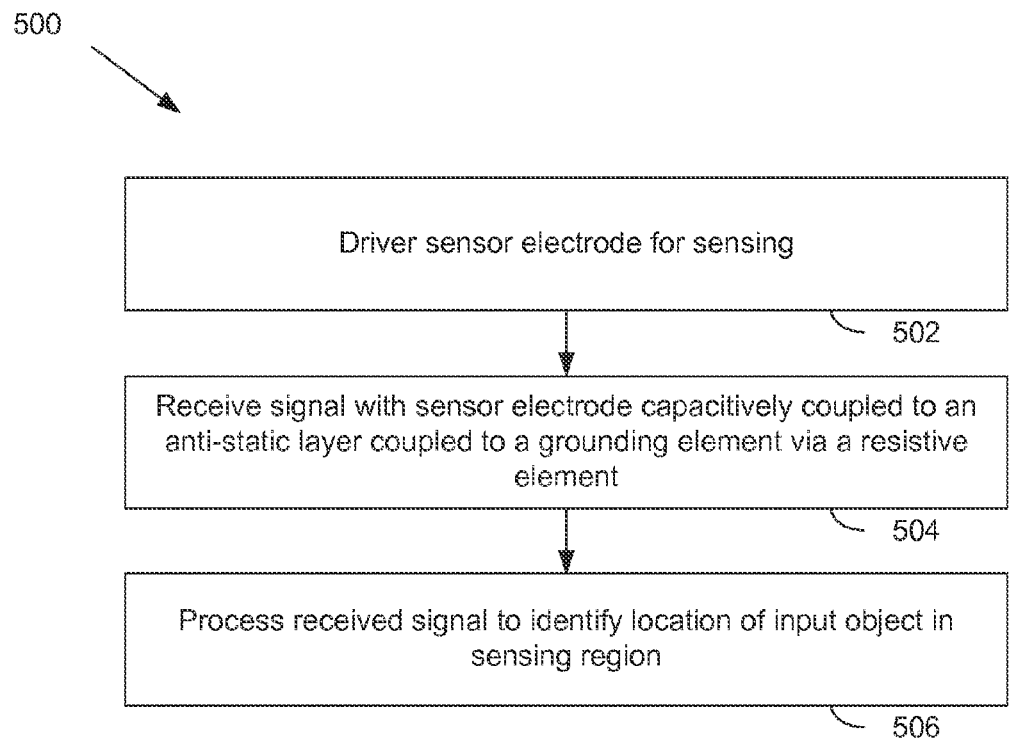
FIG. 5 is a method of sensing an input object, according to an example.

FIG. 5 is a method 500 of sensing an input object, according to an example. Although the method 500 is described with respect to the systems of FIGS. 1-4, it should be understood that any system configured to perform steps of the method 500, in various technically feasible alternative orders, is within the scope of the present disclosure.

As shown, the method 500 begins at step 502, where processing system 110 drives a sensor electrode 403 for capacitive sensing. Note that driving the processing system with capacitive sensing may comprise modulating a power supply of the input device 100 such that substantially all voltages of the input device 100 are modulated with respect to external objects such as an input object 140. Thus driving the sensor electrode 403 for capacitive sensing may effectively be done by modulating the power supply of the input object 140.

At step 504, processing system 110 receives a signal with a sensor electrode 403 that is capacitively coupled to an anti-static layer 304 that is capacitively coupled to the input object 140. The anti-static layer 304 is coupled to a current hindering circuit having a resistive circuit element, which may be, for example, a resistor or a Zener diode, to ground, which may be the chassis ground of the input device 100 or some other grounding element. The current hindering circuit having a resistive circuit element serves to limit the amount of current that flows to the grounding element from an input object 140, which improves the amount of current that flows to the receiver channel 408 associated with the sensor electrode 403 closest to the input object 140. At step 506, processing system 110 processes the received signal to determine a location of an input object. Note that at some time in which touch sensing does not occur, an optional switching element 311 may be closed to dissipate charge on the ASL 304.

Advantageously, techniques are provided whereby a current hindering circuit having a resistive circuit element is provided between an anti-static layer of an input device and grounding element. An anti-static layer coupled to ground without resistance would draw too much current and would weaken the signal received from a sensor electrode. The current hindering circuit having a resistive circuit element may be a resistor or a Zener diode that prevents current flow but discharges after a sufficient amount of current has built up across the Zener diode.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   a plurality of display elements;
   a plurality of sensor electrodes;
   a cover lens disposed over the plurality of display elements and the plurality of sensor electrodes;
   an anti-static layer disposed between the cover lens and at least a portion of the plurality of display elements and the plurality of sensor electrodes; and
   a grounding conductor coupled to the anti-static layer via a current hindering circuit having a discrete resistive circuit element.

2. The input device of claim 1, wherein:
   at least one display element of the plurality of display elements is also a sensor electrode of the plurality of sensor electrodes.

3. The input device of claim 1, wherein the current hindering circuit having the resistive circuit element comprises:
   a Zener diode configured to resist current flow to the grounding conductor until voltage across the Zener diode breaches a threshold.

4. The input device of claim 1, further comprising:
   a shorting switch coupled in parallel with the current hindering circuit having the resistive circuit element and configured to short the anti-static layer to the grounding conductor when closed.

5. The input device of claim 4, wherein:
   the shorting switch comprises a transistor.

6. The input device of claim 4, wherein:
   the shorting switch is coupled to a control circuit configured to close the shorting switch during a period of time in which display update is performed while sensing with the plurality of sensor electrodes is not performed.

7. The input device of claim 1, wherein:
   the grounding conductor comprises a conductive chassis of a mobile device that includes the plurality of display elements and the plurality of sensor electrodes.

8. The input device of claim 1, wherein:
   the current hindering circuit having the resistive circuit element comprises a resistor.

9. The input device of claim 1, further comprising:
   a processing system configured to drive the plurality of sensor electrodes for sensing during a time period during which at least one of the display elements is driven for display updates.

10. An electronic device comprising:
    an enclosure;
    a plurality of display elements within the enclosure;
    a plurality of sensor electrodes within the enclosure;
    a cover lens disposed over the plurality of display elements and the plurality of sensor electrodes and presenting a surface for touch object interface to the sensor electrodes;
    an anti-static layer disposed between the cover lens and at least a portion of the plurality of display elements and the plurality of sensor electrodes; and
    a grounding conductor coupled to the anti-static layer via a current hindering circuit having a discrete resistive circuit element.

11. The electronic device of claim 10, wherein:
at least one display element of the plurality of display elements is also a sensor electrode of the plurality of sensor electrodes.

12. The electronic device of claim 10, wherein the current hindering circuit having the resistive circuit element comprises:
a Zener diode configured to resist current flow to the grounding conductor until voltage across the Zener diode breaches a threshold.

13. The electronic device of claim 10, further comprising:
a shorting switch coupled in parallel with the current hindering circuit having the resistive circuit element and configured to short the anti-static layer to the grounding conductor when closed.

14. The electronic device of claim 13, wherein:
the shorting switch comprises a transistor.

15. The electronic device of claim 13, wherein:
the shorting switch is coupled to a control circuit configured to close the shorting switch during a period of time in which display update is performed while sensing with the plurality of sensor electrodes is not performed.

16. The electronic device of claim 10, wherein:
the grounding conductor comprises a conductive chassis that is part of the enclosure.

17. The electronic device of claim 10, wherein:
the current hindering circuit having a resistive circuit element comprises a resistor.

18. The electronic device of claim 10, further comprising:
a processing system configured to drive the plurality of sensor electrodes for sensing during a time period during which at least one of the display elements is driven for display updates.

19. A method of sensing, comprising:
updating a display element of a plurality of display elements;
driving a sensor electrode for sensing, the sensor electrode being part of a plurality of sensor electrodes; and
receiving a signal with the sensor electrode, the signal received through a capacitive coupling between the sensor electrode and an anti-static layer disposed between a cover lens and at least a portion of the plurality of display elements, the anti-static layer being coupled to a grounding conductor via a current hindering circuit having a discrete resistive circuit element.

20. The method of claim 19, wherein:
updating the display element is performed at the same time as driving the sensor electrode for sensing.

* * * * *